United States Patent [19]

Hudson et al.

[11] Patent Number: 4,499,532

[45] Date of Patent: Feb. 12, 1985

[54] FLOATING BATTERY FEED CIRCUIT

[75] Inventors: Robert C. Hudson, Woodridge; William F. MacPherson, Wheaton; Charles H. Sharpless, Wayne, all of Ill.

[73] Assignee: AT&T Bell Laboratories, Murray Hill, N.Y.

[21] Appl. No.: 477,985

[22] Filed: Mar. 23, 1983

[51] Int. Cl.³ .......................................... H02M 3/335
[52] U.S. Cl. ..................................... 363/21; 363/56; 363/97; 179/18 FA
[58] Field of Search ............................ 363/20–21, 363/55–56, 95, 97, 131; 179/16 AA, 18 FA, 70, 179/77

[56] References Cited

U.S. PATENT DOCUMENTS

| | | | |
|---|---|---|---|
| 3,909,696 | 9/1975 | Katou et al. | 363/21 |
| 4,056,691 | 11/1977 | Freimanis et al. | 179/18 FA |
| 4,063,307 | 12/1977 | Stephens | 363/56 X |
| 4,156,273 | 5/1979 | Sato | 363/56 |
| 4,302,803 | 11/1981 | Shelly | 363/20 |
| 4,400,767 | 8/1983 | Fenter | 363/21 |

*Primary Examiner*—Peter S. Wong
*Attorney, Agent, or Firm*—K. H. Samples; R. T. Watland

[57] ABSTRACT

A floating battery feed circuit comprising a switching-mode, flyback power converter wherein a capacitor connected to a converter transformer winding develops a relatively low voltage used to energize the converter control circuitry. The converter control circuitry prevents the operation of the battery feed circuit unless the voltage developed by the capacitor is above a predetermined magnitude. The power converter advantageously operates in only a constant-power mode regardless of loop impedance.

12 Claims, 4 Drawing Figures

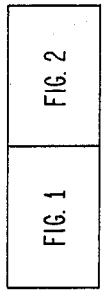
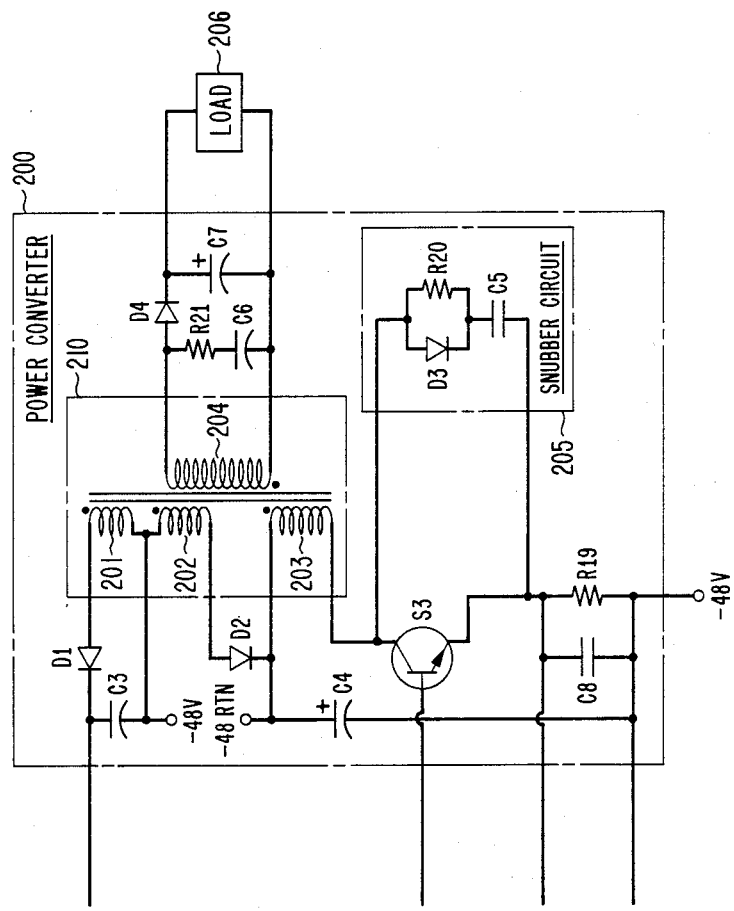

FLOATING BATTERY FEED CIRCUIT

TECHNICAL FIELD

This invention relates to power converters and, more particularly, to floating battery feed circuits for use in telephone line circuits.

BACKGROUND OF THE INVENTION

In telephone systems, line circuits serve as an interface between communication lines connected to subscriber sets and the telephone switching network. Traditionally, the line circuit has included a battery feed to energize the subscriber set. It has been recognized that the effect of longitudinal currents, which are frequently induced in a subscriber loop because of nearby electrical power lines, can be minimized when the battery feed is capable of floating with respect to ground. Known line circuits have implemented a floating battery feed by using a transformer to isolate the subscriber set from the office DC source.

In the telephone subscriber line circuit disclosed in U.S. Pat. No. 4,056,691 issued to L. Freimanis et. al. on Nov. 1, 1977, a switching-mode, flyback power converter which supplies current to a telephone loop, operates in a constant-power mode for low loop impedances but otherwise operates in a constant-current mode. Although representing a significant advance over previous circuits, the Freimanis circuit has a number of disadvantages. The control circuitry which alternately connects and disconnects the office DC source to the primary winding of a converter transformer at a rate dependent on the loop impedance to achieve constant-current operation is relatively complex. Further since that control circuitry is energized by the office DC source, e.g., a 48-volt source, its implementation using presently available, low-voltage integrated circuit technology is not possible. In view of the foregoing, a recognized problem in the art is providing a floating battery feed circuit of reduced cost and complexity having a control circuit which operates at a voltage substantially lower than 48 volts.

SUMMARY OF THE INVENTION

The aforementioned problem is advantageously solved and a technical advance is achieved in accordance with the principles of the invention in a floating battery feed circuit comprising a switching-mode, flyback power converter, wherein an energy storage element, e.g., a capacitor, connected to a converter transformer winding, develops a relatively low voltage used to energize the converter control circuitry and wherein that control circuitry prevents the operation of the battery feed circuit unless the voltage developed by the energy storage element is above a predetermined magnitude. In accordance with another aspect of the invention, the power converter advantageously operates in only a constant-power mode regardless of the load impedance.

A battery feed circuit in accordance with the present invention supplies power from a source of potential to an electrical load. The battery feed circuit includes a transformer having a first winding, a second winding magnetically coupled to the first winding and connectible to the load and a third winding magnetically coupled to the first winding. The battery feed circuit also includes an energy storage element connected to the third winding to develop a voltage thereacross. A control signal generator responds to the voltage across the energy storage element by generating control signals only after that voltage exceeds a predetermined magnitude. A switch responds to the control signals by selectively connecting the source of potential to the first winding.

BRIEF DESCRIPTION OF THE DRAWING

A more complete understanding of the invention may be obtained from a consideration of the following description when read in conjunction with the drawing in which:

FIGS. 1 and 2, when arranged in accordance with FIG. 3, present a detailed diagram of an exemplary battery feed circuit in accordance with the present invention.

DETAILED DESCRIPTION

Figure 1:
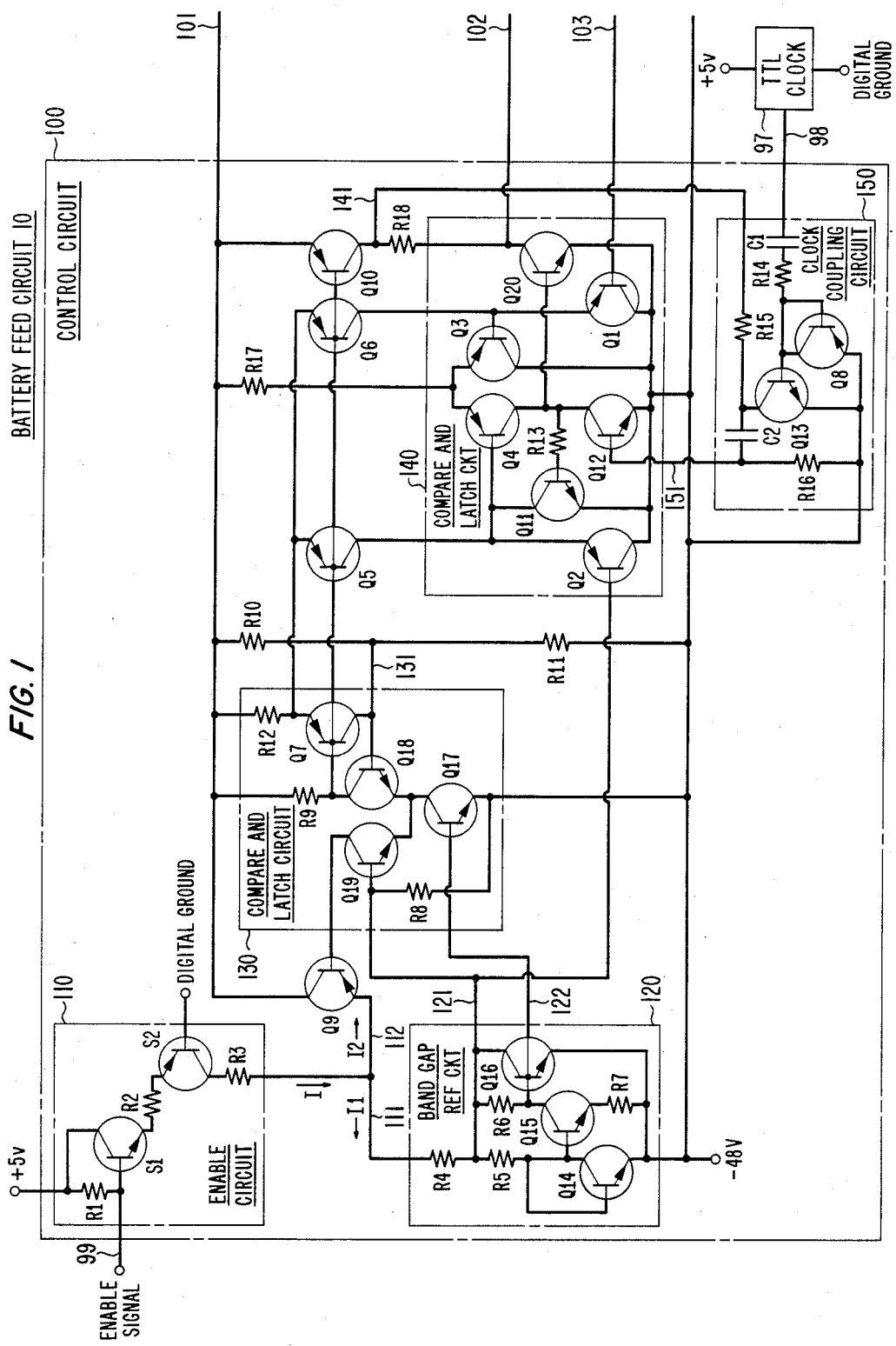

FIGS. 1 and 2, arranged in accordance with FIG. 3, present a diagram of an exemplary battery feed circuit 10 in accordance with the present invention. Battery feed circuit 10 includes a switching-mode flyback power converter 200 which operates to transfer energy to a load 206 from a 48-volt DC voltage source having terminals designated −48 V and −48 RTN in FIG. 2. Power converter 200 includes a transformer 210 having a primary winding 203, a secondary winding 204, a catch winding 202, and a feedback winding 201. Primary winding 203 is connected in series with a switching transistor S3 and a resistor R19 across the 48-volt DC voltage source. Secondary winding 204 is connected via a diode D4 to a capacitor C7 connected in parallel with load 206. Switching transistor S3 is cyclically turned ON and OFF to alternately connect and disconnect the 48-volt DC voltage source terminal −48 V and primary winding 203. When switching transistor S3 is turned ON, energy from the 48-volt DC voltage source is stored by transformer 210 since diode D4 is reverse-biased and therefore no current can flow in secondary winding 204. However, when switching transistor S3 is subsequently turned OFF, the voltages across windings 203 and 204 reverse polarity, diode D4 becomes forward-biased and the energy previously stored by transformer 210 is transferred to capacitor C7 and load 206.

The operation of power converter 200 is controlled by a control circuit 100. The description which follows is arranged in two parts. First, battery feed circuit 10 is described with control circuit 100 being described in terms of its functional operation. Then control circuit 100 is described in greater detail.

Figure 4:
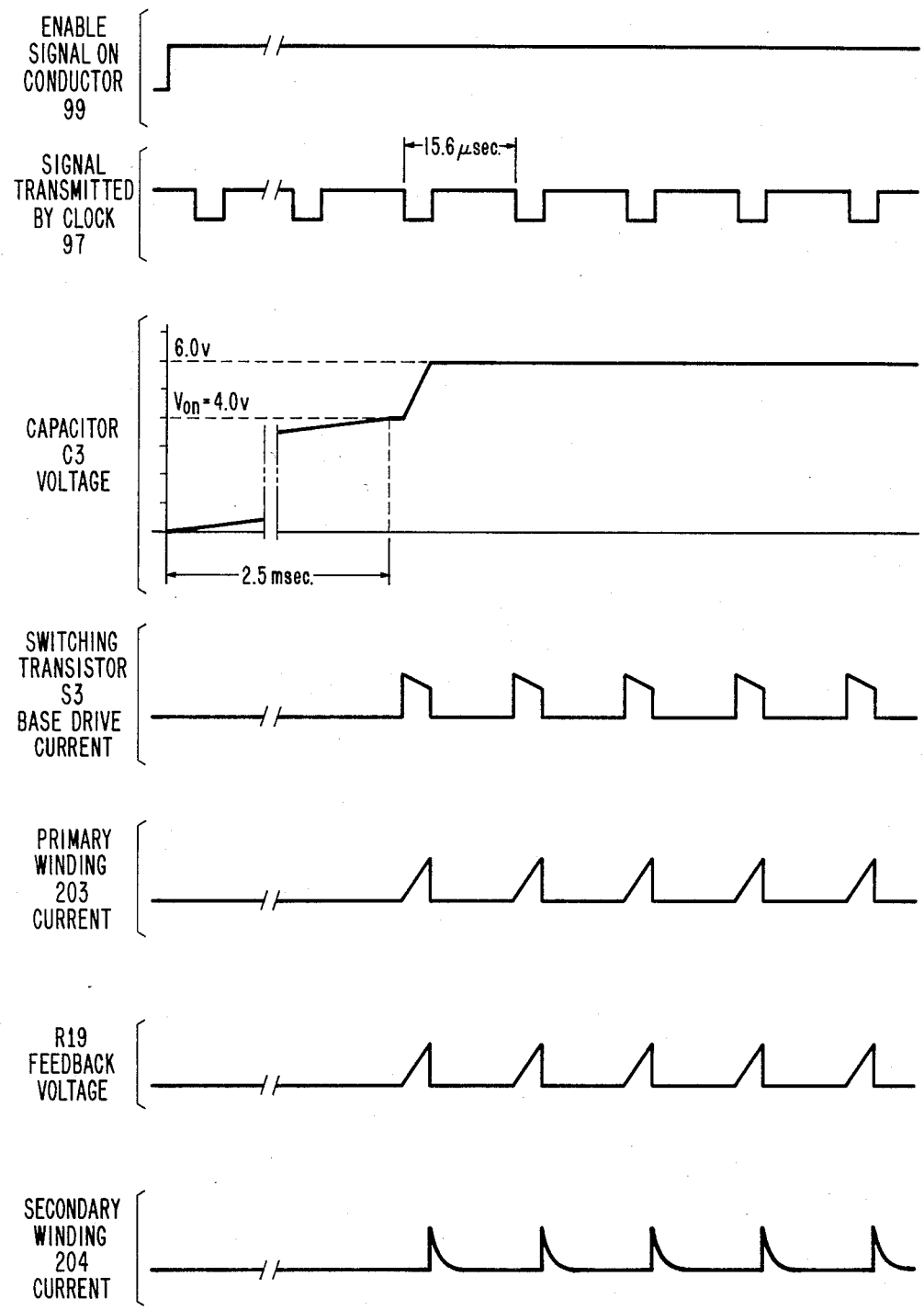
FIG. 4 is a timing diagram illustrating the relationship among various signal waveforms in the battery feed circuit of FIGS. 1 and 2.

Control circuit 100 is energized by the voltage developed by a capacitor C3 which is connected via a diode D1 to feedback winding 201. During each of the above-described power converter 200 operation cycles, energy from the 48-volt DC voltage source is transferred via feedback winding 201 to capacitor C3 to maintain the capacitor C3 voltage. Capacitor C3 is initially substantially discharged. When a logic one enable signal (FIG. 4) is received on a conductor 99 to initiate the operation of battery feed circuit 10, an enable circuit 110 supplies current via a conductor 101 to charge capacitor C3. When sufficient energy has been stored in capacitor C3 such that the capacitor C3 voltage (FIG.

4) reaches a predetermined voltage, $V_{on}$, which in the present embodiment is approximately 4.0 volts, enable circuit 110 stops supplying current via conductor 101 to capacitor C3. A capacitor C3 voltage of 4.0 volts sufficiently energizes control circuit 100 to ensure the safe operation of switching transistor S3 as further described herein. In the present embodiment, the capacitor C3 voltage reaches the predetermined voltage, $V_{on}$, approximately 2.5 milliseconds after the logic one enable signal is received on conductor 99.

A clock 97, energized by a 5-volt DC voltage source having terminals designated +5 V and DIGITAL GROUND in FIG. 1, generates a 64-kilohertz, 25 percent duty cycle clock signal (FIG. 4) on a conductor 98. Accordingly, the clock signal on conductor 98 has a period of approximately 15.6 microseconds. After the capacitor C3 voltage has reached the predetermined voltage, $V_{on}$, and a clock coupling circuit 150 subsequently receives, via conductor 98, a logic zero clock signal (FIG. 4) from clock 97, the current from an enabling transistor Q10 is provided via conductor 102 as base drive current (FIG. 4) to switching transistor S3. In response to the base drive current from enabling transistor Q10, switching transistor S3 turns ON to apply approximately 48 volts across primary winding 203. The current in primary winding 203 increases substantially linearly (FIG. 4) at a rate which depends on the inductance of winding 203. No current flows in secondary winding 204 because diode D4 is reverse-biased. Most of the energy supplied by the 48-volt DC voltage source is stored by transformer 210. However, the voltage across primary winding 203 induces a voltage across feedback winding 201 to forward bias diode D1 and current is supplied to capacitor C3. In the present embodiment, the current from winding 201 increases the capacitor C3 voltage to approximately 6.0 volts.

A compare and latch circuit 140 monitors, via a conductor 103, the voltage across resistor R19 (FIG. 4), which voltage is proportional to the primary winding 203 current. When the voltage across resistor R19 increases to a predetermined voltage, $V_{ref}$, which in the present embodiment is approximately 1.236 volts, compare and latch circuit 140 reduces the base drive current (FIG. 4) supplied via conductor 102 to zero and switching transistor S3 turns OFF. The voltages across windings 203 and 204 reverse polarity, diode D4 becomes forward-biased, and a decreasing current (FIG. 4) flows from secondary winding 204 via diode D4 as the energy previously stored by transformer 210 is transferred to capacitor C7 and load 206. Capacitor C7 stores the energy received from secondary winding 204 to maintain a relatively constant voltage as energy is supplied to load 206. Note that in the present embodiment, switching transistor S3 turns OFF at approximately the same time that the clock signal transmitted by clock 97 changes from a logic zero to a logic one level. However, it is the increase in the resistor R19 voltage to $V_{ref}$, not the clock signal transition, that results in switching transistor S3 turning OFF.

A second cycle is initiated when the next logic zero clock signal (FIG. 4) from clock 97 is received by clock coupling circuit 150 and the current from enabling transistor Q10 is again provided via conductor 102 as base drive current (FIG. 4) to turn switching transistor S3 ON. Energy from the 48-volt DC voltage source is again stored by transformer 210 until the primary winding 203 current increases such that the voltage across resistor R19 reaches the predetermined voltage, $V_{ref}$. Switching transistor S3 is then turned OFF and the energy stored by transformer 210 is again transferred to capacitor C7 and load 206 to complete the second cycle. The process repeats and energy is transferred from the 48-volt DC voltage source to load 206 via transformer 210 and capacitor C7 at a constant rate. Accordingly, battery feed circuit 10 supplies a constant magnitude of power independent of the value of load 206. During each cycle, the voltage across primary winding 203 induces a voltage across feedback winding 201 and a current flows to capacitor C3 to maintain its voltage at approximately 6.0 volts.

When the logic one enable signal is removed from conductor 99 to terminate the operation of battery feed circuit 10, enabling transistor Q10 stops supplying current via conductor 102 as base drive current to switching transistor S3. Accordingly, switching transistor S3 is not turned ON when subsequent logic zero clock signals are transmitted by clock 97 and, therefore, no additional energy is transferred from the 48-volt DC voltage source to load 206. Advantageously, compare and latch circuit 140 diverts the current supplied by enabling transistor Q10 if clock 97 stops transmitting logic zero clock signals on conductor 98. Accordingly, switching transistor S3 is held safely in the OFF state. In addition, if the voltage across capacitor C3 falls below a predetermined voltage, $V_{off}$, which in the present embodiment is approximately 3.5 volts, enabling transistor Q10 stops supplying current via conductor 102 as base drive current to switching transistor S3 and enable circuit 110 again supplies current via conductor 101 to charge capacitor C3. When the capacitor C3 voltage again exceeds $V_{on}$, enable circuit 110 stops supplying current via conductor 101 to charge capacitor C3 and enabling transistor Q10 again supplies current via conductor 102 as base drive current to switching transistor S3 to resume operation.

The capacitor C3 connected across feedback winding 201 develops the voltage needed to energize control circuit 100 to supply base drive current to switching transistor S3. It is desirable that the supplied base drive current be sufficient to place switching transistor S3 in saturation. Otherwise, a large collector-emitter voltage may develop across transistor S3 and the power dissipated by transistor S3, as the primary winding 203 current (FIG. 4) increases, may be large enough to destroy the device. Accordingly, control circuit 100 advantageously does not begin to supply base drive current via conductor 102 to switching transistor S3 until the capacitor C3 voltage has increased to the predetermined voltage, $V_{on}$. Control circuit 100 is then able to supply a base drive current via conductor 102 of sufficient magnitude to saturate switching transistor S3. If, for any reason, the voltage falls below the predetermined voltage, $V_{off}$, control circuit 100 advantageously stops supplying base drive current via conductor 102 to switching transistor S3. Note that $V_{off}$ is less than $V_{on}$. This hysteresis prevents control circuit 100 from remaining in an intermediate equilibrium state, after the capacitor C3 voltage has been increased from zero to $V_{on}$, as could occur if the predetermined voltages $V_{off}$ and $V_{on}$ were equal.

CONTROL CIRCUIT 100

The exemplary embodiment of control circuit 100 shown in FIG. 1 will now be described in greater detail. Control circuit 100 includes enable circuit 110 which is energized by the 5-volt DC voltage source and comprises two transistors S1 and S2 and three resistors R1, R2 and R3. When the logic one enable signal (FIG. 4) is received on conductor 99, transistors S1 and S2 turn ON and a predetermined, substantially constant current I is supplied through resistor R3. Resistor R3 is connected via a conductor 111 to a band gap reference circuit 120 and also via a conductor 112, a transistor Q9 and conductor 101 to capacitor C3. The currents which flow in conductors 111 and 112 are defined as I1 and I2, respectively. Band gap reference circuit 120, which is an arrangement of three transistors Q14, Q15 and Q16 and four resistors R4, R5, R6 and R7 connected between conductor 111 and the terminal −48 V, develops a reference voltage at a conductor 121 dependent on the magnitude of the current I1 but relatively independent of temperature over a wide range of temperatures at which battery feed circuit 10 must operate. The reference voltage at conductor 121 is transmitted to compare and latch circuits 130 and 140. The initial current flow I1 to band gap reference circuit 120 is sufficient to turn transistors Q14, Q15 and Q16 ON. The base terminal of transistor Q16 is connected via a conductor 122 to the base terminal of a transistor Q17 included in compare and latch circuit 130. Transistor Q17 operates as a current mirror in that substantially equal collector currents flow in transistors Q16 and Q17. When transistor Q16 turns ON, transistor Q17 also turns ON. The initial voltage developed at conductor 121 after the current I1 begins to flow is transmitted to a transistor Q19 included in compare and latch circuit 130 and transistor Q19 turns ON. The collector terminal of transistor Q19 is connected to the base terminal of transistor Q9. Transistor Q9 turns ON in response to transistor Q19 turning ON. When transistor Q9 turns ON, a portion of the constant current I flows as the current I2 via transistor Q9 and conductor 101 to charge capacitor C3. The magnitude of the remainder of the constant current I, which remainder flows as the current I1 to band gap reference circuit 120, is such that band gap reference circuit 120 develops a reference voltage of approximately 1.0 volt at conductor 121.

Compare and latch circuit 130 comprises an arrangement of four transistors Q7, Q17, Q18 and Q19 and three resistors R8, R9 and R12 wherein transistors Q18 and Q19 operate as a comparator to compare the voltage on conductor 121 to the voltage on a conductor 131 and wherein transistors Q18 and Q7 operate as an NPN-PNP latch to hold transistor Q18 in the ON state once the voltage on conductor 131 exceeds the voltage on conductor 121. A voltage divider comprising two resistors R10 and R11 and having the junction therebetween connected to conductor 131 is connected between conductor 101 and the terminal −48 V. The values of resistors R10 and R11 are chosen such that when the voltage on conductor 101 is the predetermined voltage $V_{on}=4.0$ volts, the voltage on conductor 131 is approximately 1.0 volt. When the current I2 has flowed via transistor Q9 and conductor 101 for a sufficient time to charge capacitor C3 to exceed the voltage $V_{on}$, and accordingly the voltage on conductor 131 exceeds the 1.0 volt reference voltage on conductor 121, transistor Q18 turns ON and transistor Q19 turns OFF. Transistor Q7 also turns ON to hold transistor Q18 latched in the ON state. When transistor Q19 turns OFF, transistor Q9 also turns OFF and the current I2 flowing via conductor 101 to charge capacitor C3 is reduced to zero. Now all of the constant current I flows as the current I1 to band gap reference circuit 120 and an increased voltage $V_{ref}=1.236$ volts is developed at conductor 121. However, due to the latch operation of transistors Q18 and Q7, transistor Q18 remains ON.

The collector terminal of transistor Q18 is connected to the base terminal of each of three enabling transistors Q5, Q6 and Q10. Turning transistors Q18 and Q7 ON results in turning ON the enabling transistors Q5 and Q6 to enable the operation of compare and latch circuit 140 and in turning ON enabling transistor Q10 which is used both to supply base drive current to switching transistor S3 and to enable the operation of a clock coupling circuit 150. Compare and latch circuit 140 comprises an arrangement of seven transistors Q1, Q2, Q3, Q4, Q11, Q12 and Q20 and a resistor R13, which arrangement is energized by the capacitor C3 voltage via conductor 101 and a resistor R17. Transistors Q1, Q2, Q3 and Q4 comprise a comparator which compares the voltage developed by band gap reference circuit 120 at conductor 121 with the feedback voltage developed across resistor R19 at conductor 103. Transistors Q11 and Q4 comprise an NPN-PNP latch which is set when the voltage at conductor 103 exceeds the voltage at conductor 121. The latch comprising transistors Q11 and Q4 is reset when clock coupling circuit 150 transmits a reset pulse via a conductor 151 to turn transistor Q12 ON resulting in transistor Q11 turning OFF. Clock coupling circuit 150 comprises two transistors Q8 and Q13, three resistors R14, R15 and R16 and two capacitors C1 and C2. When enabling transistors Q10 is turned ON to enable clock coupling circuit 150 via conductor 141, the clock signal transmitted by clock 97 on conductor 98 is buffered by capacitor C1 and transistor Q13 and differentiated by the network comprising resistors R15 and R16 and capacitor C2 to generate reset pulses at conductor 151. The reset pulses at conductor 151 are of a predetermined duration and are generated on only the logic one to logic zero clock signal transitions. The first logic zero clock signal transmitted by clock 97 on conductor 98, after transistors Q5, Q6 and Q10 have turned ON to enable compare and latch circuit 140 and clock coupling circuit 150, results in a reset pulse being transmitted via conductor 151. The reset pulse turns transistor Q12 ON and transistor Q11 OFF. Transistor Q10 is connected via a resistor R18 both to the collector terminal of transistor Q20 and via conductor 102 to the base terminal of switching transistor S3. Transistor Q11 being turned OFF by the reset pulse on conductor 151 also results in transistor Q20 being turned OFF. Therefore, the current supplied by capacitor C3 via transistor Q10 and resistor R18, rather than being diverted by transistor Q20, is available as base drive current via conductor 102 to turn switching transistor S3 ON. Recall that once switching transistor S3 is turned ON, the voltage across resistor R19 (FIG. 4) increases linearly. When the resistor R19 voltage increases to exceed the predetermined voltage $V_{ref}$, i.e., the voltage on conductor 103 exceeds the voltage on conductor 121, the latch comprising transistors Q4 and Q11 is set. Transistor Q20 is again turned ON and the current from transistor Q10 and resistor R18 is again diverted by transistor Q20 rather than being supplied via conductor 102 as base drive current to switching transistor S3. Accordingly, switching transistor S3 turns OFF and the resistor R19 voltage drops to zero. However, due to the operation of the latch comprising transistors Q4 and Q11, transistor Q20 remains ON until a second reset pulse is received on conductor 151 to begin a second cycle of operation.

When the logic one enable signal is removed from conductor 99, enable circuit 110 no longer supplies current via conductor 111 to band gap reference circuit 120 and transistors Q16 and Q17 both turn OFF. The transistors Q18 and Q7 comprising the NPN-PNP latch also turn OFF when transistor Q17 turns OFF. Accordingly, enabling transistors Q5, Q6 and Q10 also turn OFF to disable compare and latch circuit 140 and clock coupling circuit 150. Since transistor Q10 is OFF, base drive current can no longer be supplied via conductor 102 to switching transistor S3. Therefore, no additional energy is transferred from the 48-volt DC voltage source to load 206.

Recall that when the capacitor C3 voltage was initially increased to exceed $V_{on}=4.0$ volts, the voltage at conductor 131 exceeded a 1.0 volt reference voltage at conductor 121 and the latch comprising transistors Q18 and Q7 turned ON. Also recall that the reference voltage at conductor 121 was subsequently increased to $V_{ref}=1.236$ volts when the current I2 was reduced to zero. When transistor Q7 is ON, resistor R12 is effectively connected in parallel with resistor R10. Accordingly, the proportion of the capacitor C3 voltage that is present at conductor 131 is increased. In the present embodiment, the value of resistor R12 is selected such that with transistor Q7 ON and a capacitor C3 voltage of $V_{off}=3.5$ volts, the voltage at conductor 131 is less than 1.236 volts. If at any time before the logic one enable signal is removed from conductor 99, the capacitor C3 voltage drops below the predetermined voltage $V_{off}=3.5$ volts, the voltage at conductor 131 becomes less than the reference voltage $V_{ref}=1.236$ volts at conductor 121. Transistors Q18 and Q7 comprising the NPN-PNP latch and the enabling transistors Q5, Q6 and Q10 therefore turn OFF. However, transistor Q19 and, accordingly, transistor Q9 again turn ON. The constant current I supplied by enable circuit 110 is again split in the same manner as after the logic one enable signal was initially received at conductor 99. Part of the current I flows as the current I2 via conductor 112, transistor Q9 and conductor 101 to charge capacitor C3. The remainder of the current I flows as the current I1 via conductor 111 to band gap reference circuit 120 and a reference voltage of approximately 1.0 volt is developed at conductor 121. Accordingly, when the capacitor C3 voltage again reaches the predetermined voltage $V_{on}$, the latch comprising transistors Q18 and Q7 and the enabling transistors Q5, Q6 and Q10 will again turn ON to resume operation.

One situation where the capacitor C3 voltage will drop below the predetermined voltage, $V_{off}$, occurs when load 206 becomes short circuited. Recall that during each cycle, the voltage across primary winding 203 induces a voltage across feedback winding 201 and a current flows to capacitor C3 to maintain its voltage. If load 206 becomes short circuited, the primary winding 203 current increases much more rapidly than the linear increase shown in FIG. 4 and, accordingly, the resistor R19 feedback voltage exceeds $V_{ref}$ in a much shorter time period to set the latch comprising transistors Q4 and Q11. Accordingly, base drive current is supplied via conductor 102 to switching transistor S3 for only a short time period, which in the present embodiment, is equal to the predetermined duration of the reset pulse transmitted by clock coupling circuit 150 on conductor 151 since the latch comprising transistors Q4 and Q11 cannot be set while transistor Q12 is held ON. Since the current in primary winding 203 flows for only a shortened period, the current which flows from winding 201 during that period is not sufficient to maintain the capacitor C3 voltage above the predetermined voltage, $V_{off}$. When the capacitor C3 voltage reduces to $V_{off}$, control circuit 100 stops supplying base drive current via conductor 102 to switching transistor S3 and again supplies current via conductor 101 to charge capacitor C3 as described above. As long as load 206 remains short circuited, this process repeats. Control circuit 100 alternately supplies base drive current via conductor 102 to switching transistor S3 for a number of cycles until the capacitor C3 voltage is reduced to $V_{off}$ and then control circuit 100 stops supplying base drive current via conductor 102 to switching transistor S3 and resumes supplying current via conductor 101 until the capacitor C3 voltage again reaches $V_{on}$. Accordingly, battery feed circuit 10 operates in a low-power mode when load 206 is short circuited. Although not shown in FIG. 4 or described above, battery feed circuit 10 also initially operates in a similar mode for a number of cycles until capacitor C7 becomes charged. The arrangement comprising compare and latch circuits 130 and 140, enabling transistors Q5, Q6 and Q10 and resistors R10, R11, R17 and R18 is referred to herein as a control signal generator.

The exemplary embodiment of battery feed circuit 10 includes a number of features which improve its operation and reliability. For example, a snubber circuit 205, comprising a capacitor C5 in series with the parallel combination of a resistor R20 and a diode D3, is connected across switching transistor S3 to slow the increase in the transistor S3 collector-emitter voltage which results as transistor S3 turns OFF. The transistor S3 collector current is thereby given additional time to decrease and the power dissipated by transistor S3 does not exceed device safe operation limits. In addition, the current which flows from primary winding 203 through snubber circuit 205 and resistor R19, as switching transistor S3 turns OFF, results in a resistor R19 voltage which increases the rate at which base charge is removed to turn transistor S3 OFF.

A filter capacitor C4 is connected across the 48-volt DC voltage source terminals −48 V and −48 RTN to filter voltage transients. A filter capacitor C8 is connected across resistor R19 to filter any voltage transients on conductor 103 from snubber circuit 205 and, in addition, to prevent the voltage across feedback resistor R19 from becoming negative. A negative voltage across resistor R19 could prevent switching transistor S3 from turning OFF.

A diode D2 connected in series with catch winding 202 across the 48-volt DC voltage source terminals −48 V and −48 RTN limits the voltage developed across winding 202 during the transformer 210 discharge cycle to 48 volts. Catch winding 202 and primary winding 203 have the same number of turns. Therefore, the voltage across primary winding 203 is also, at most, 48 volts during the transformer 210 discharge cycle, with the end of winding 203 connected to switching transistor S3 being positive with respect to the −48-volt DC voltage source terminal −48 RTN. Thus, the collector-emitter voltage of transistor S3 is limited to 96 volts, which is within the allowable voltage range of the device. In addition, when a no-load condition is present across secondary winding 204, the energy stored in transformer 210 during the charge cycle will be returned during the discharge cycle, via catch winding 202 and diode D2 to the −48-volt DC voltage source.

Compare and latch circuit 140 is advantageously configured as a two-stage differential amplifier having a latch on the second stage. Because transistor Q1 is connected between conductor 103 and the base terminal of transistor Q3, the transistor Q3 base voltage is not reduced to zero when switching transistor S3 is turned OFF. Accordingly, the latch comprising transistors Q11 and Q4 can remain ON until a reset pulse is received on conductor 151. Further, the base drive current drawn by transistor Q2 is sufficiently small that the voltage developed by band gap reference circuit 120 at conductor 121 is not reduced thereby. Because resistor R13 is connected between the collector terminal of transistor Q4 and the base terminal of transistor Q11, most of the transistor Q4 collector current flows as base drive current to transistor Q20. Accordingly, the switching transistor S3 base terminal can be rapidly discharged through transistor Q20. The relatively small base drive current which flows through resistor R13 to the base terminal of transistor Q11 does not drive transistors Q11 and Q4 into heavy saturation. Accordingly, transistors Q11 and Q4 can turn OFF rapidly when the reset pulse is received on conductor 151.

In the present embodiment, transistors Q18 and Q7 and the value of resistor R12 are selected such that at least one of the transistors Q18 and Q7 does not saturate. This allows transistors Q18 and Q7 to turn OFF rapidly when the capacitor C3 voltage drops below $V_{off}$. The forward current gain of transistor Q20 is selected to be sufficiently large that the switching transistor S3 base terminal is rapidly discharged when transistor Q20 turns ON. The components of clock coupling circuit 150 are selected such that the duration of the reset pulse transmitted on conductor 151 is long enough to allow the latch comprising transistors Q11 and Q4 to reset but not so long that the transistor S3 collector current exceeds safe limits when load 206 becomes short circuited. Note that in the present embodiment, the 48−volt DC voltage source terminal −48 RTN and the 5−volt DC voltage source terminal DIGITAL GROUND are not necessarily at the same voltage level. Transistor S2 and resistor R3 and transistors Q8 and Q13 protect the components of battery feed circuit 10 in the event that voltage transients occur between the terminals −48 RTN and DIGITAL GROUND. For example, a large voltage transient on conductor 98 drives transistor Q13 to saturation thereby holding transistor Q12 OFF. Accordingly, transistors Q11 and Q20 remain ON and switching transistor S3 is held OFF for the duration of such voltage transient.

It is to be understood that the above-described embodiment is merely illustrative of the principles of the invention and that other arrangements may be devised by those skilled in the art without departing from the spirit and the scope of the invention.

What is claimed is:

1. A battery feed circuit for supplying power from a source of potential to an electrical load comprising
   transformer means comprising first winding means, second winding means magnetically coupled to said first winding means and connectible to said load and third winding means magnetically coupled to said first winding means,
   energizing means comprising energy storage means connected to said third winding means for storing energy to develop a voltage,
   control signal generator means responsive to said voltage for generating control signals only after said voltage exceeds a first predetermined magnitude and
   switching means responsive to said control signals for selectively connecting said source of potential to said first winding means,
   wherein said control signal generator means further comprises means for terminating the generation of said control signals by said control signal generator means when said voltage is below a second predetermined magnitude.

2. A battery feed circuit in accordance with claim 1 wherein said energizing means further comprises means for charging said energy storage means until said voltage exceeds said first predetermined magnitude.

3. A battery feed circuit in accordance with claim 2 further comprising
   means for generating clock signals,
   means for generating a reference signal and
   means for generating a feedback signal proportional to current flow from said source of potential to said first winding means,
   wherein said control signal generator means further comprises means for generating one of said control signals having a first value in response to one of said clock signals and for generating one of said control signals having a second value when said reference signal does not exceed said feedback signal and
   wherein said switching means responds to said control signal having said first value by connecting said source of potential to said first winding means and responds to said control signal having said second value by disconnecting said source of potential from said first winding means.

4. A battery feed circuit in accordance with claim 3 wherein said transformer means further comprises fourth winding means connected to said source of potential and magnetically coupled to said first winding means for limiting the voltage across said first winding means and thereby limiting the voltage across said switching means.

5. A battery feed circuit in accordance with claim 4 wherein said clock signals are of fixed frequency, whereby said battery feed circuit supplies a constant magnitude of power independent of the value of said electrical load.

6. A battery feed circuit in accordance with claim 2 wherein said switching means comprises a switching transistor connected between said source of potential and said first winding means,
   wherein said charging means comprises means responsive to an enable signal for supplying current to charge said energy storage means,
   wherein said control signal generator means further comprises an enabling transistor connected between said energy storage means and a base terminal of said switching transistor, and means responsive to said enable signal after said voltage exceeds said predetermined magnitude for placing said enabling transistor in a conductive state to supply base drive currents from said energy storage means to said base terminal of said switching transistor as said control signals and responsive to a removal of said enable signal for placing said enabling transistor in an non-conductive state,
   whereby the operation of said battery feed circuit in supplying power to said electrical load is enabled in response to said enable signal and is disabled in response to the removal of said enable signal.

7. A battery feed circuit in accordance with claim 1 further comprising
reference circuit means responsive to an enable signal for generating a first reference level,
wherein said control signal generator means further comprises comparator means for comparing a first fraction of said voltage to said first reference level to determine when said voltage exceeds said first predetermined magnitude,
wherein said reference circuit means is responsive to a determination by said comparator means that said voltage exceeds said first predetermined magnitude for generating a second reference level,
wherein said comparator means is responsive to said determination by said comparator means for comparing a second fraction of said voltage to said second reference level to determine when said voltage is below said second predetermined magnitude.

8. A battery feed circuit in accordance with claim 7 further comprising
means for generating clock signals and
means for generating a feedback signal proportional to current flow from said source of potential to said first winding means,
wherein said control signal generator means further comprises means for generating one of said control signals having a first value in response to one of said clock signals and for generating one of said control signals having a second value when said second reference level does not exceed said feedback signal and
wherein said switching means responds to said control signal having said first value by connecting said source of potential to said first winding means and responds to said control signal having said second value by disconnecting said source of potential from said first winding means.

9. A battery feed circuit in accordance with claim 8 wherein said clock signals are of fixed frequency,
whereby said battery feed circuit supplies a constant magnitude of power independent of the value of said electrical load.

10. A battery feed circuit for supplying power from a source of potential to an electrical load comprising
transformer means comprising first winding means, second winding means magnetically coupled to said first winding means and connectible to said load and third winding means magnetically coupled to said first winding means,
energizing means comprising energy storage means connected to said third winding means for storing energy to develop a voltage,
control signal generator means responsive to said voltage for generating control signals only after said voltage exceeds a first predetermined magnitude,
switching means responsive to said control signals for selectively connecting said source of potential to said first winding means,
means for generating clock signals,
means for generating a reference signal and
means for generating a feedback signal proportional to current flow from said source of potential to said first winding means,
wherein said control signal generator means further comprises means for generating one of said control signals having a first value in response to one of said clock signals and for generating one of said control signals having a second value when said reference signal does not exceed said feedback signal and
wherein said switching means responds to said control signal having said first value by connecting said source of potential to said first winding means and responds to said control signal having said second value by disconnecting said source of potential from said first winding means.

11. A battery feed circuit in accordance with claim 10 wherein said transformer means further comprises fourth winding means connected to said source of potential and magnetically coupled to said first winding means for limiting the voltage across said first winding means and thereby limiting the voltage across said switching means.

12. A battery feed circuit in accordance with claim 10 wherein said clock signals are of fixed frequency,
whereby said battery feed circuit supplies a constant magnitude of power independent of the value of said electrical load.

* * * * *